June 26, 1934.                D. MARKLE                1,964,669
                        APPARATUS FOR SHIPPING COAL
                      Filed May 3, 1931    3 Sheets-Sheet 3
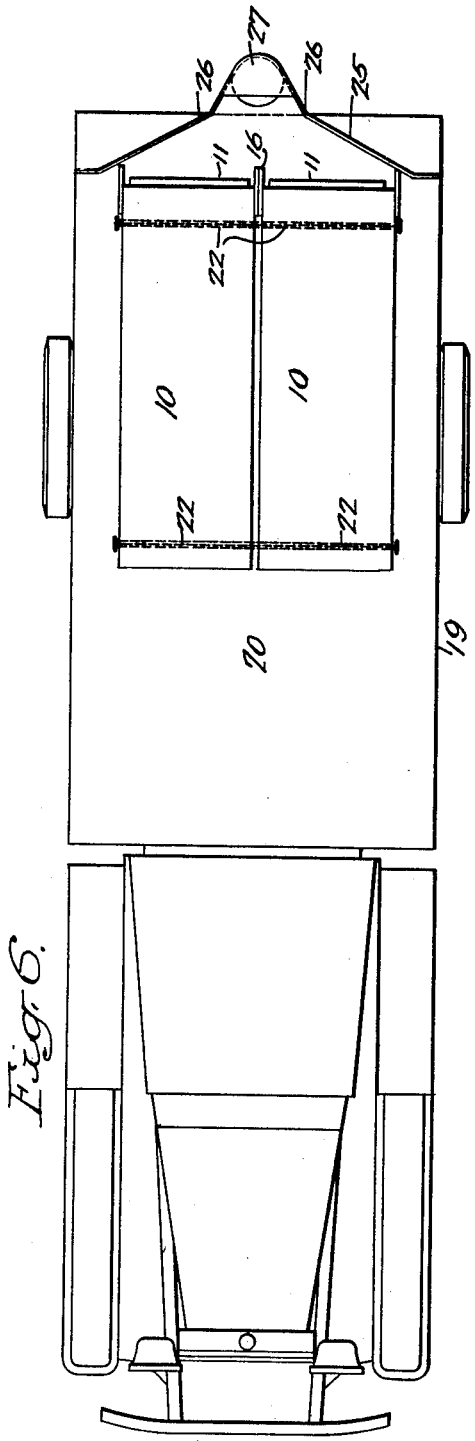
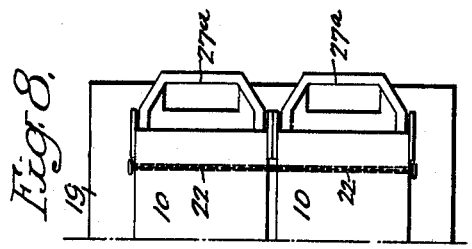
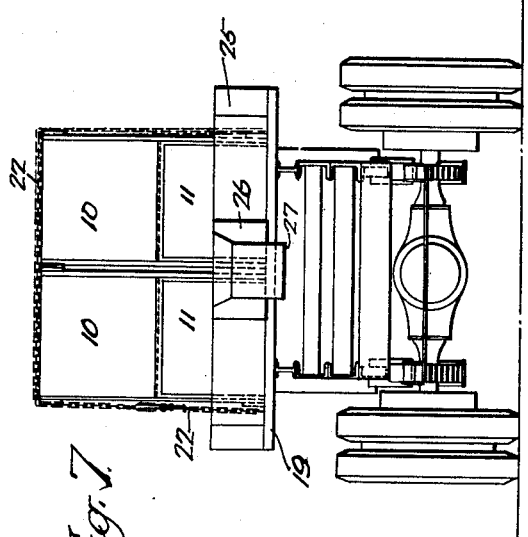
Inventor
Donald Markle
by his Attorneys
Howson & Howson Patented June 26, 1934

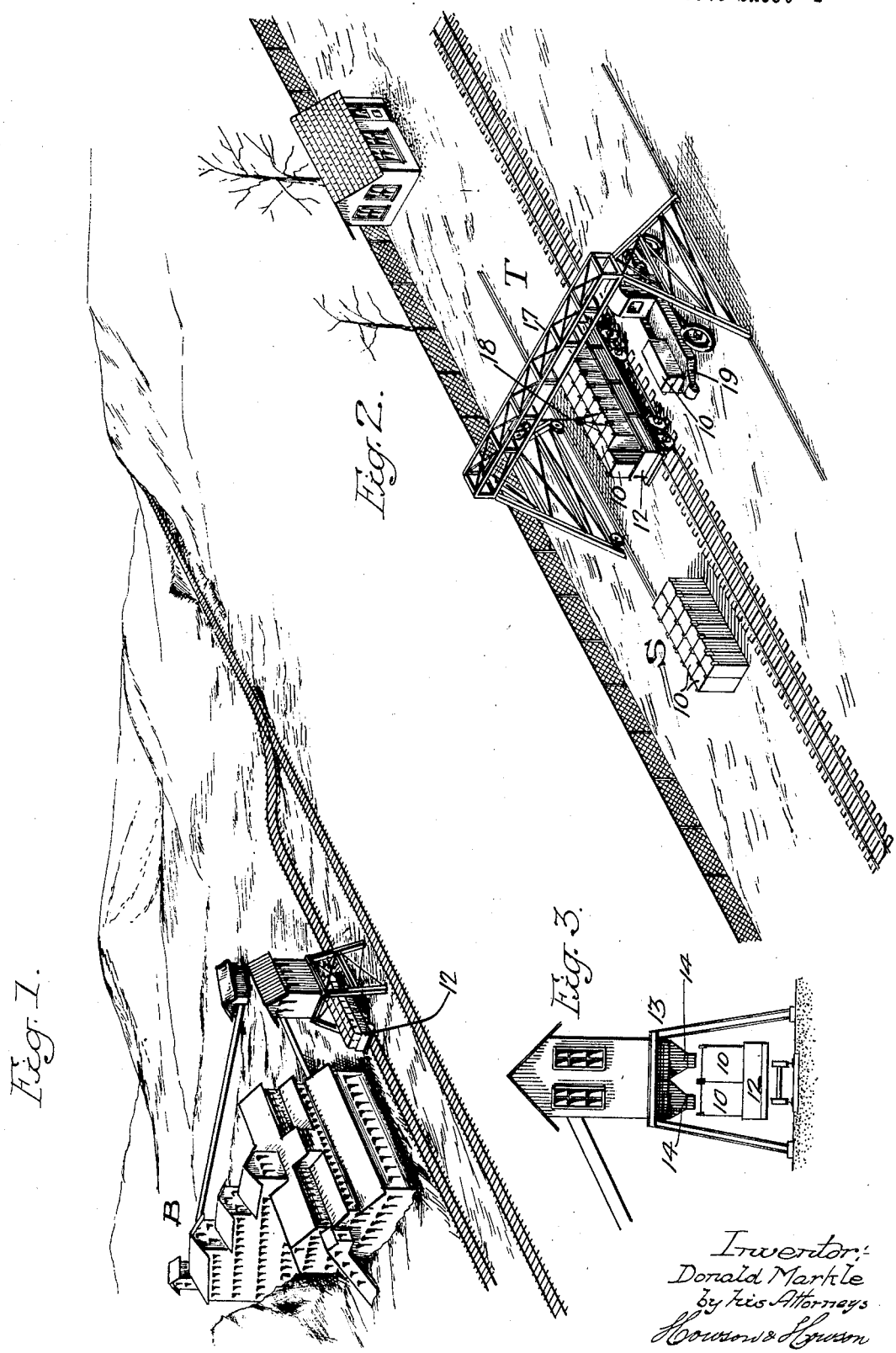

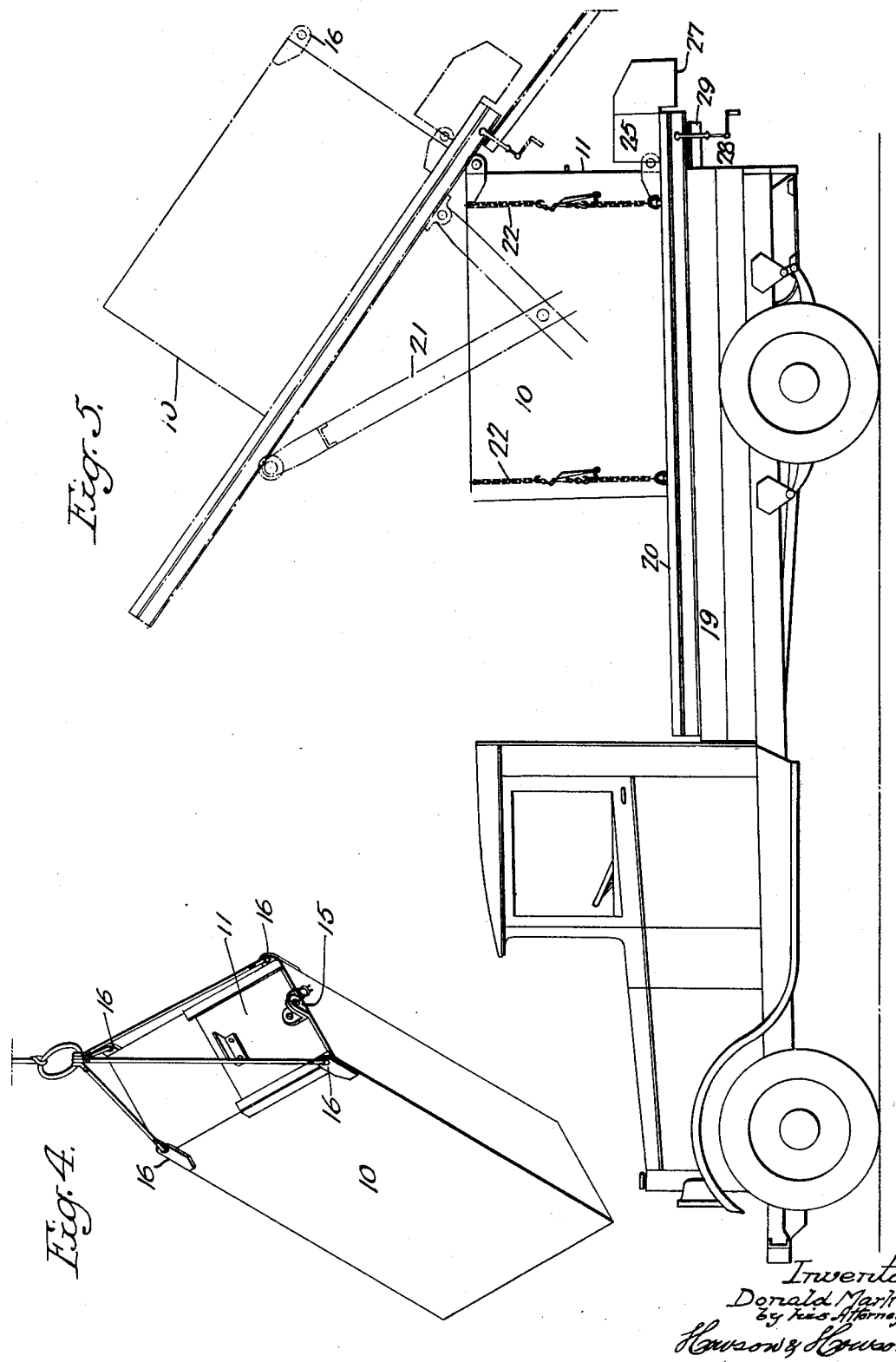

1,964,669

UNITED STATES PATENT OFFICE 1,964,669

APPARATUS FOR SHIPPING COAL

Donald Markle, Jeddo, Pa.

Application May 8, 1931, Serial No. 535,967

5 Claims. (Cl. 294—67)

This invention relates to a method of, and apparatus for handling friable lump or granular substances in transportation, and more particularly to a method of handling coal during shipment thereof from the point of origin to the ultimate consumer.

An important object of the invention is the elimination of losses due to the handling of coal by the present system of transportation in open cars and subsequent transfer through dealers' bins to vehicles transporting it to the consumer. This involves a multiplicity of handlings of the coal, including loading and unloading of the cars and conveying from storage pockets or bins to the truck and subsequent unloading of the truck.

Coal and other solid fuels are usually very brittle or friable and these frequent handlings result in considerable breakage, dusting or crushing of the fuel, with the result that its value is considerably decreased.

Furthermore, the coal during shipment is exposed to the weather and to theft, resulting in further losses, and usually during storage at the dealers' yards is exposed to the weather.

A further and more specific object of the invention is the transportation of coal in sealed closed containers, each capable of receiving a predetermined amount of the material, the coal remaining in these containers from the time it is loaded therein at the mines until it reaches the ultimate consumer so that it is protected from weather and from breakage resulting from frequent handlings, and is likewise protected against losses by theft, or substitution by unscrupulous handlers.

These and other objects I attain by the construction shown in the accompanying drawings wherein, for the purpose of illustration, I have shown a preferred embodiment of my invention and wherein:

Fig. 1 is a perspective view illustrating the loading of the containers at the breakers while in position in the flat cars;

Fig. 2 is a perspective view illustrating the removal of the containers from the flat cars and the placing of the same in storage and in position upon trucks to transport the same;

Fig. 3 is a detail view illustrating the loading of the containers in the cars by independent weighing mechanisms;

Fig. 4 is a perspective view showing a convenient type of handling sling for use in unloading the containers from the cars;

Fig. 5 is a side elevation of a truck suitable for use in transporting the containers from the yard to the consumer, the construction lines illustrating the discharge position of the truck deck;

Fig. 6 is a plan view of the truck with the containers in position thereon;

Fig. 7 is an end elevation thereof; and

Fig. 8 is a fragmentary end elevation illustrating a slight modification of the discharge mechanism.

In accordance with my invention I employ containers 10 each of rectangular or oblong rectangular form and having a front wall 10a, rear wall 10b, bottom wall 10c, top wall 11a and side walls 11b, and each adapted to hold a predetermined quantity of coal, say, for example, one ton, these containers each having a door 11 at one (the top) and 11a thereof, the door opening being arranged between the center and one (the front) side 10a of the container and the outer edge of the door opening preferably coinciding with said wall 10a of the container. Containers of this character are disposed in a flat car 12 in side-to-side relation and are suitably secured therein against shifting movements. In the present instance I have shown the car as receiving two containers abreast, although it will, of course, be understood that the number of containers so received will depend entirely upon the container dimensions which may be varied as desired. In placing the containers in the cars the door openings are disposed uppermost and the car filled with containers is passed beneath an automatic weighing mechanism 13 which may be at the discharge of the breakers "B" of the mine, said automatic weighing mechanism embodying weighing units 14, one for each container of a transverse series; that is to say, where two containers are disposed abreast in the car, the automatic weighing apparatus will embody two weighing units with their independent weighing mechanisms and discharge spouts. The discharge spouts are so positioned that they will be arranged over the filling openings of the containers and it will be obvious that it is simply necessary to rack the car along between each filling operation so that the spouts are disposed over the next pair of containers. As the containers are filled, they are closed and a seal passed through co-acting seal-receiving elements carried by the container bodies and doors 11, as indicated at 15. Such containers, in order to be conveniently manipulated, are provided at the four corners of that end thereof having the door with eyes 16 for the reception of the sling hooks of hoisting mechanisms.

The loaded car is then moved to the terminal

"T" at the city in which the dealer or dealers ordering the contents of the car have their offices. At the terminal a crane 17 is provided having sling hook mechanism 18 including a suspension member 18a and pairs of rods, cables or other connecting elements 18b and 18c to engage the containers in such manner that when lifted they may be either set upon their bottom ends 11b, i. e., their ends opposite the ends 11a, or upon their front sides. This may be readily accomplished by making the sling hook connectors or tethers 18b which engage the eyes 16 at the corners of the front side 10a of the container where the door opening is flush with the side wall of the container longer than the connectors or tethers 18c which engage the eyes 16 at the corners of the opposite or rear side 10b of the container, thus permitting the container to cant so that when swinging it into position upon a support it will strike first upon its edge portion 10d at the angle of intersection of its front and bottom walls 10a and 11b and may be guided by an attendant to tilt upon such edge 10c as a fulcrum to either drop upon its side 10a or upon its end 11b. Such containers 10 as are not to be immediately delivered to the consumer are placed in open storage in a yard, as indicated at "S", thus immediately freeing the car 12 and eliminating demurrage charges. As shown, the door 11 shown in the present instance is a sliding door opening in a direction away from wall 10a.

Containers taken either from this storage or directly from the cars may then be placed upon transport vehicles 19 which may be motor trucks of usual design with the exception of the fact that the body thereof is in the form of a flat bed 20 which may be tilted and which preferably may be tilted and elevated as indicated by the construction lines of Fig. 5, in which numeral 21 generally designates mechanism for simultaneously elevating and tilting the bed. The containers when placed upon this bed are swung downward thereupon in a horizontal position with that wall 10a with which the outer edge of the door opening coincides resting on the bed, so that when the door is opened the contents of the container may all be discharged upon the bed 20. The bed is preferably of sufficient size to accommodate a plurality of the containers in side to side relation, as more clearly shown in Fig. 6, and holddown mechanism such as chains 24 are preferably provided to secure the containers against shifting although the weight of such containers when loaded is ordinarily sufficient to prevent shifting. The rear of the body is preferably provided with an upstanding wall 25 having rearwardly converging sections 26 opposing the ends of the containers when in position thereon and combining at their adjacent ends with a hooded discharge spout 27. The bed may be adapted as generally indicated at 28 to support a chute 29 by means of which contents passing from the spout 27 may be directed to a desired point, as for example, through an open cellar window or a bin port. Spout 27 will additionally serve to direct the material into baskets, bags or other carriers employed for transporting the coal from the curb to the point of storage elected by the consumer.

When the vehicle 19 arrives at its destination, the body is tilted, or tilted and elevated, as the case may be, the door of the container which is to be discharged is opened and the contents thereof permitted to pass through the discharge spout 27. Since the containers have independent doors, it is possible to place upon the same vehicle body consignments for a plurality of customers and to independently discharge the same. At the same time, each customer receives an exact shipment of coal both the quality and quantity of which has been accurately determined by the party most concerned as to said quality and quantity; that is to say, the producer who depends upon these factors for continued sales of his product. The described mode of placing, transporting and dumping or unloading the container obviously simplifies the procedure greatly and therefore reduces the number of parts and working steps required as compared with previous systems employed.

It will be obvious that materials handled in this manner may be delivered by the dealer at a cost much reduced from that attending shipment of coal in the ordinary manner, for the goods being in a package which is sealed and, therefore, inaccessible to the elements and of difficult access to thieves may be shipped at a much lower rate than is ordinarily possible and depreciation is thereby reduced and the necessity for regrading eliminated.

It is pointed out that in discharging coal from the ordinary hopper bottom transport car and through the chutes of the dealers' bins there is considerable breakage, necessitating regrading on the part of the dealer who is making an honest attempt to deliver goods of the represented quality. The losses, as a result of breakage, form no inconsiderable part of the dealers' costs which are hereby eliminated, because in the handling in the containers 10 there is no opportunity for the coal to break by movement of the particles against one another and it is, accordingly, in substantially the same condition in which it left the mine, at the time of its delivery to the consumer.

While I have illustrated the truck as of the end-dump variety, it will be quite obvious that if so desired this truck may be of the side-dump type. Likewise, instead of employing a single discharge spout on the truck body for controlling the discharge from all of the containers individual spouts for the containers may be provided if so desired, as illustrated in Fig. 8. In this figure an independent discharge spout 27—a is provided for each container which the body is adapted to receive, the sides of these spouts being so spaced from one another that the ears 10—a provided at each corner of the container and adapted for engagement with hoisting mechanisms may extend between the spouts and thus serve as a means for preventing transverse displacement and for exactly locating the container with relation to the spout. It will also be obvious that while tilting bodies have been illustrated and the use thereof is preferred, any suitable means may be provided for tilting the container to cause discharge of the contents thereof.

Since the apparatus employed is, obviously, capable of considerable modification without in any manner departing from the spirit of my invention, I do not wish to be understood as limiting myself to apparatus details except as hereinafter claimed.

I claim:

1. A container having a filling and emptying opening at one end thereof, and hoisting means connected to said end of the container for swinging the same onto or off the horizontal supporting bed of a transportation vehicle, said hoisting means embodying a suspending element and connecting and controlling elements between the same and the container operating in the action of said hoisting means in swinging the container onto the supporting bed to bring the opposite end of the container onto the bed to serve as a fulcrum and to cause the container to tilt by gravity on said fulcrum so as to bring the container into a horizontal position with a prescribed side thereof resting upon the supporting bed.

2. A container having a filling and emptying opening at one end thereof located between the transverse center of said end and one of the sides of the container, and hoisting means connected to said end of the container for swinging the same onto or off the horizontal supporting bed of a transportation vehicle, said hoisting means embodying a suspending element and connecting and controlling elements between the same and the container operating in the action of said hoisting means in swinging the container onto the supporting bed to bring the opposite end of the container onto the bed to serve as a fulcrum and to cause the container to tilt by gravity on said fulcrum so as to bring the container into a horizontal position with a prescribed side thereof resting upon the supporting bed.

3. A container having a filling and emptying opening at one end thereof, and hoisting means connected to said end of the container for raising and lowering the container and swinging the same onto or off a supporting surface, said hoisting means embodying a suspending member and connecting and controlling elements between the same and the container operating in the swinging action to support the container at a angle so as to bring the edge portion of the container at an angle of intersection of its opposite end with one of its sides first into contact to serve as a fulcrum on which the container may be tilted to bring its second-named end or its said side to rest upon said supporting surface.

4. A container having a filling and emptying opening at its upper end located between the transverse center of said end and one of the sides of the container and intersecting said container side, and hoisting means connected to the upper end of the container for raising and lowering the container and swinging the same onto or off a supporting surface, said hoisting means embodying a suspending member and connecting and controlling elements between the same and the corners of the receptacle operating in the swinging action to support the container at an angle so as to bring the edge portion of the container located at the angle of its bottom end and that side of the container intersected by the filling and emptying opening first into contact with the supporting surface to serve as a fulcrum on which the container may be tilted to bring its bottom end or its aforesaid side to rest upon said supporting surface.

5. A container having a filling and emptying opening at its upper end located between the transverse center of said end and one of the sides of the container and intersecting said container side, and hoisting means connected to the upper end of the container for raising and lowering the container and swinging the same onto or off a supporting surface, said hoisting means embodying a suspending member and relatively long and short connecting and controlling elements between the same and the corners of the receptacle at said side of the receptacle and the diametrically opposite side of the receptacle respectively, said connections operating in the swinging action to support the container at an angle so as to bring the edge portion of the container located at the angle of its bottom end and that side of the container intersected by the filling and emptying opening first into contact with the supporting surface to serve as a fulcrum on which the container may be tilted to bring its bottom end or its aforesaid side to rest upon said supporting surface.

DONALD MARKLE.